(12) United States Patent
Fuji et al.

(10) Patent No.: US 10,775,197 B2
(45) Date of Patent: Sep. 15, 2020

(54) SENSOR

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yoshihiko Fuji, Kawasaki Kanagawa (JP); Keiju Yamada, Yokohama Kanagawa (JP); Kei Masunishi, Kawasaki Kanagawa (JP); Michiko Hara, Yokohama Kanagawa (JP); Yoshihiro Higashi, Komatsu Ishikawa (JP); Kazuaki Oakamoto, Yokohama Kanagawa (JP); Shiori Kaji, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 194 days.

(21) Appl. No.: 16/119,373

(22) Filed: Aug. 31, 2018

(65) Prior Publication Data

US 2019/0285436 A1  Sep. 19, 2019

(30) Foreign Application Priority Data

Mar. 14, 2018 (JP) ................. 2018-047113
Aug. 20, 2018 (JP) ................. 2018-154093

(51) Int. Cl.
*G01D 5/16* (2006.01)
*G01D 5/48* (2006.01)
(Continued)

(52) U.S. Cl.
CPC ............ *G01D 5/16* (2013.01); *G01D 5/485* (2013.01)

(58) Field of Classification Search
CPC . G01D 5/16; G01D 5/48; G01D 5/485; G01L 1/125; G01L 3/101; G01L 3/102;
(Continued)

(56) References Cited

U.S. PATENT DOCUMENTS 9,342,179 B2   5/2016 Fuji et al.
2008/0247586 A1* 10/2008 Takano ................. H04R 1/38
                                                  381/361
(Continued)

FOREIGN PATENT DOCUMENTS

JP   2005-198694 A   7/2005
JP      4866957 B2   2/2012
(Continued)

*Primary Examiner* — Son T Le
(74) *Attorney, Agent, or Firm* — Finnegan, Henderson, Farabow, Garrett & Dunner, L.L.P.

(57) ABSTRACT

According to one embodiment, a sensor includes a sensing element portion and a first magnetic portion. The sensing element portion includes a supporter, a deformable film portion supported by the supporter, and a first element including a magnetic layer and being provided at the film portion. The first magnetic portion is separated from the sensing element portion. The first magnetic portion includes a plurality of first holes. A width of one of the plurality of first holes along a second direction is narrower than a length of the sensing element portion along the second direction and wider than a length of the first element along the second direction. The second direction crosses a first direction from the film portion toward the first element.

20 Claims, 8 Drawing Sheets

(51) Int. Cl.
*H04R 21/00* (2006.01)
*G01R 33/09* (2006.01)

(58) Field of Classification Search
CPC ... G01L 5/0023; G01L 5/0038; G01L 9/0001; G01L 9/0016; G01L 9/0022; G01L 9/0026; G01H 11/08; B81C 1/00158; G01R 15/205; G01R 33/0327; G01R 33/09; H04R 19/04; H04R 21/00; H04R 21/02
See application file for complete search history.

(56) References Cited

U.S. PATENT DOCUMENTS

| | | | |
|---|---|---|---|
| 2013/0170669 A1* | 7/2013 | Fukuzawa | G01L 9/0042 381/115 |
| 2015/0088008 A1* | 3/2015 | Fuji | G01L 9/16 600/485 |
| 2016/0091575 A1 | 3/2016 | Yamada et al. | |
| 2016/0093796 A1* | 3/2016 | Arai | H01L 43/02 257/422 |
| 2016/0112807 A1* | 4/2016 | Yuan | H04R 19/04 381/174 |
| 2017/0067791 A1* | 3/2017 | Fuji | H04R 1/46 |

FOREIGN PATENT DOCUMENTS

| | | |
|---|---|---|
| JP | 2016-70848 A | 5/2016 |
| JP | 6098729 B2 | 3/2017 |
| JP | 2017-216461 A | 12/2017 |

* cited by examiner

SENSOR

CROSS-REFERENCE TO RELATED APPLICATIONS

This application is based upon and claims the benefit of priority from Japanese Patent Application No. 2018-047113, filed on Mar. 14, 2018, and Japanese Patent Application No. 2018-154093, filed on Aug. 20, 2018; the entire contents of which are incorporated herein by reference.

FIELD

Embodiments described herein relate generally to a sensor.

BACKGROUND

A sensor that uses a magnetic layer has been proposed. It is desirable for the sensor to have stable characteristics.

DETAILED DESCRIPTION

Figure 1A:
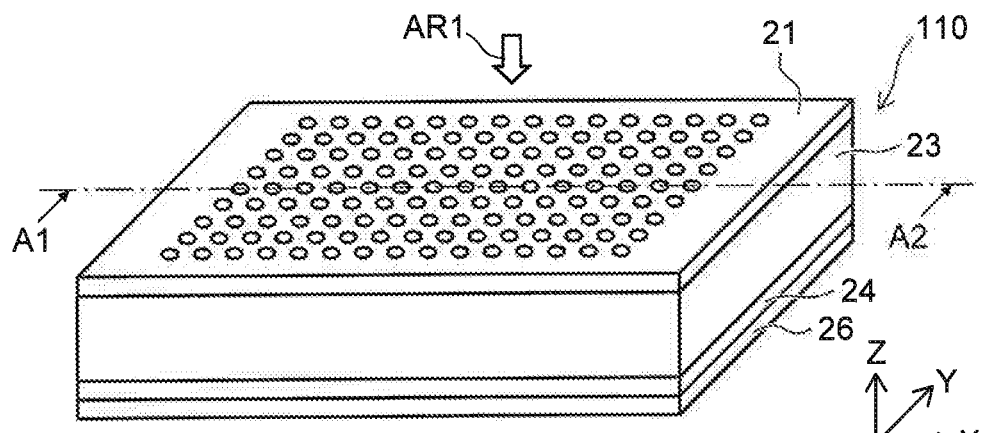
FIG. 1A to FIG. 1C are schematic views illustrating a sensor according to a first embodiment.

According to one embodiment, a sensor includes a sensing element portion and a first magnetic portion. The sensing element portion includes a supporter, a deformable film portion supported by the supporter, and a first element including a magnetic layer and being provided at the film portion. The first magnetic portion is separated from the sensing element portion. The first magnetic portion includes a plurality of first holes. A width of one of the plurality of first holes along a second direction is narrower than a length of the sensing element portion along the second direction and wider than a length of the first element along the second direction. The second direction crosses a first direction from the film portion toward the first element.

According to one embodiment, a sensor includes a sensing element portion and a first magnetic portion. The sensing element portion includes a supporter, a deformable film portion supported by the supporter, and a first element including a magnetic layer and being provided at the film portion. The first magnetic portion is separated from the sensing element portion. The first magnetic portion has a first surface and a second surface crossing a first direction. The first direction is from the film portion toward the first element. The first surface is between the second surface and the sensing element portion. The first magnetic portion includes a plurality of first holes. A first width of one of the plurality of first holes at the first surface is different from a second width of the one of the plurality of first holes at the second surface.

According to one embodiment, a sensor includes a sensing element portion and a first magnetic portion. The sensing element portion includes a supporter, a deformable film portion supported by the supporter, and a first element including a magnetic layer and being provided at the film portion. The first magnetic portion is separated from the sensing element portion. The first magnetic portion has a first surface and a second surface crossing a first direction. The first direction is from the film portion toward the first element. The first surface is between the second surface and the sensing element portion. The first magnetic portion includes a plurality of first holes. One of the plurality of first holes has a first width at the first surface, a second width at the second surface, and a third width at a position between the first surface and the second surface. The third width is narrower than the first width and narrower than the second width.

According to one embodiment, a sensor includes a sensing element portion and a first magnetic portion. The sensing element portion includes a supporter, a deformable film portion supported by the supporter, and a first element including a magnetic layer and being provided at the film portion. The first magnetic portion is separated from the sensing element portion. The first magnetic portion includes a plurality of first holes. An extension direction of one of the plurality of first holes is tilted with respect to a first direction. The first direction is from the film portion toward the first element.

According to one embodiment, a sensor includes a sensing element portion, a first magnetic portion, and a second magnetic portion. The sensing element portion includes a supporter, a deformable film portion supported by the supporter, and a first element including a magnetic layer and being provided at the film portion. The first magnetic portion is separated from the sensing element portion. The first magnetic portion is separated from the second magnetic portion and is provided between the second magnetic portion and the sensing element portion in a first direction. The first direction is from the film portion toward the first element. The first magnetic portion includes one or a plurality of first holes. The second magnetic portion includes one or a plurality of second holes.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
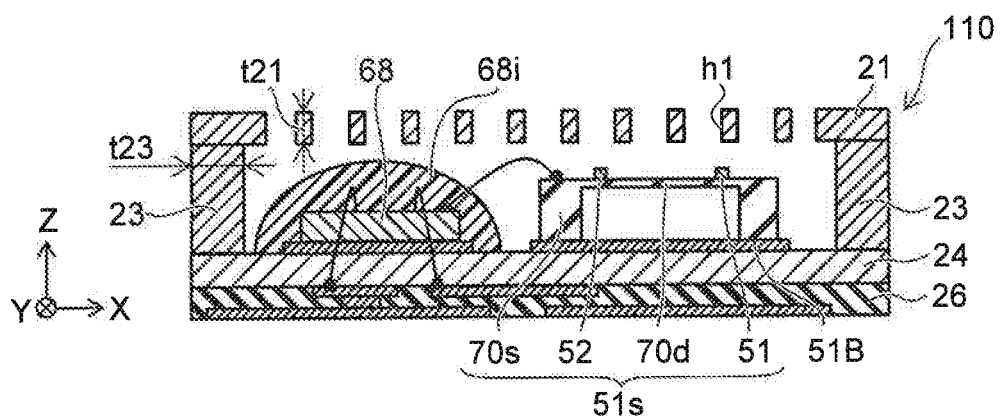
Figure 1C:
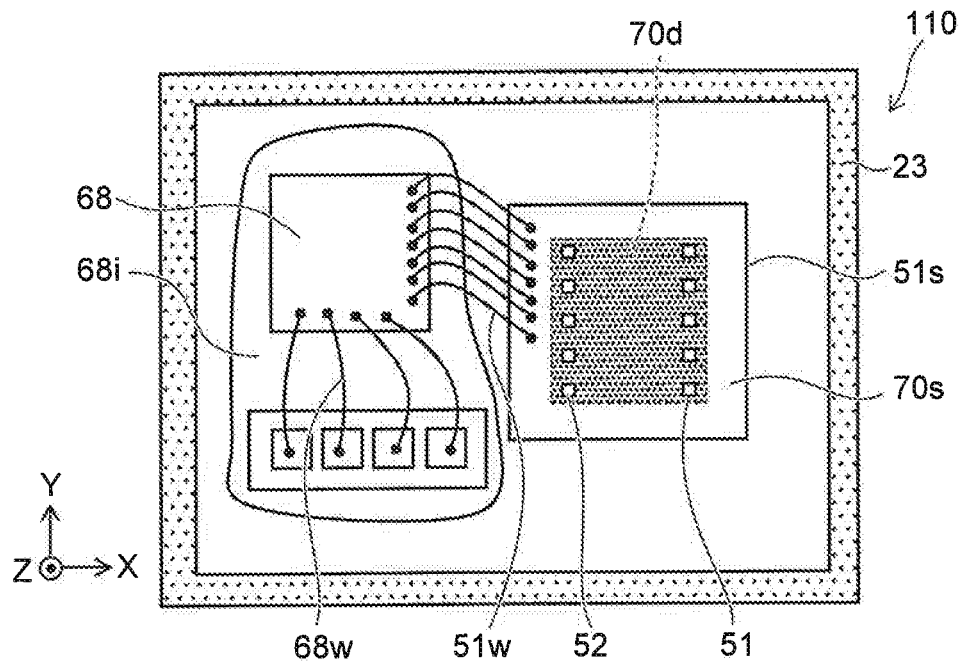

FIG. 1A to FIG. 1C are schematic views illustrating a sensor according to a first embodiment.

FIG. 1A is a perspective view. FIG. 1B is a line A1-A2 cross-sectional view of FIG. 1A. FIG. 1C is a plan view along arrow AR1 of FIG. 1A. Some of the components are not illustrated for easier viewing of the drawing in FIG. 1C.

As shown in FIG. 1B, the sensor 110 according to the embodiment includes a sensing element portion 51s and a first magnetic portion 21. A third magnetic portion 23, a fourth magnetic portion 24, a base body 26, and a control element portion 68 are further provided in the example. As described below, a second magnetic portion may be provided. The sensor 110 is, for example, a magnetic device. The sensor 110 is, for example, an element package.

The base body 26 is, for example, a printed circuit board, etc. For example, the fourth magnetic portion 24 is provided between the base body 26 and the first magnetic portion 21. The third magnetic portion 23, the sensing element portion 51s, and the control element portion 68 are provided between the fourth magnetic portion 24 and the first magnetic portion 21. For example, the third magnetic portion 23 is provided around the sensing element portion 51s and the control element portion 68 between the fourth magnetic portion 24 and the first magnetic portion 21. For example, these magnetic portions function as magnetic shields.

As shown in FIG. 1B, the sensing element portion 51s is fixed by a fixing member 51B to a portion of the fourth magnetic portion 24. The fixing member 51B is, for example, silicone, etc. The control element portion 68 is fixed to another portion of the fourth magnetic portion 24. In the example, an insulating resin 68i is provided around the control element portion 68.

As shown in FIG. 1C, the sensing element portion 51s and the control element portion 68 are electrically connected by wires 51w. Wires 68w are connected to the control element portion 68 and are electrically connected to the outside.

As shown in FIG. 1A and FIG. 1B, the sensing element portion 51s includes a supporter 70s, a film portion 70d, and a first element 51. A second element 52 is further provided in the example.

The film portion 70d is supported by the supporter 70s. The film portion 70d is deformable. The first element 51 and the second element 52 are provided at the film portion. As described below, these elements include multiple magnetic layers.

For example, the resistance of the sensing element portion 51s (the electrical resistance of at least one of the first element 51 or the second element 52) changes according to the deformation of the film portion 70d. For example, the orientation of the magnetization of at least one of the multiple magnetic layers changes when an external force is applied to the film portion 70d. For example, this is based on magnetostriction. As a result, the angle between the magnetizations of the multiple magnetic layers changes. The electrical resistance changes due to the change of the angle. For example, this is based on the magnetoresistance effect. The external force that is applied (e.g., sound (including an ultrasonic wave) or the like) can be detected by detecting the change of the electrical resistance of the sensing element portion 51s.

For example, the control element portion 68 can detect a characteristic (at least one of an electrical resistance, a voltage, or a current) relating to the change of the electrical resistance of the sensing element portion 51s. For example, the control element portion 68 applies a voltage to the sensing element portion 51s. For example, the control element portion 68 processes a signal obtained from the sensing element portion 51s. The control element portion 68 includes, for example, an electronic circuit. The control element portion 68 includes, for example, an ASIC.

As shown in FIG. 1B, the direction from the film portion 70d toward the first element 51 is taken as a first direction. As described below, for example, the first direction is aligned with a direction from one of the multiple magnetic layers toward another of the multiple magnetic layers. The first direction corresponds to a Z-axis direction illustrated in FIG. 1A, etc. One direction perpendicular to the Z-axis direction is taken as an X-axis direction. A direction perpendicular to the Z-axis direction and the X-axis direction is taken as a Y-axis direction.

The first magnetic portion 21 is provided in the embodiment. For example, the first magnetic portion 21 is along the X-Y plane. As shown in FIG. 1B, the first magnetic portion 21 is separated from the sensing element portion 51s. A space is provided between the first magnetic portion 21 and the sensing element portion 51s in the Z-axis direction. The film portion 70d that is included in the sensing element portion 51s can deform because the first magnetic portion 21 is separated from the sensing element portion 51s.

The first magnetic portion 21 includes multiple first holes h1. The external force (e.g., the sound (including the ultrasonic wave) or the like) is transmitted to the film portion 70d through the multiple first holes h1. At least a portion of the multiple first holes h1 overlaps the sensing element portion 51s in the Z-axis direction. For example, the first magnetic portion 21 includes a region between the multiple first holes h1. This region overlaps the sensing element portion 51s in the Z-axis direction. This region overlaps the film portion 70d in the Z-axis direction.

Figure 2:
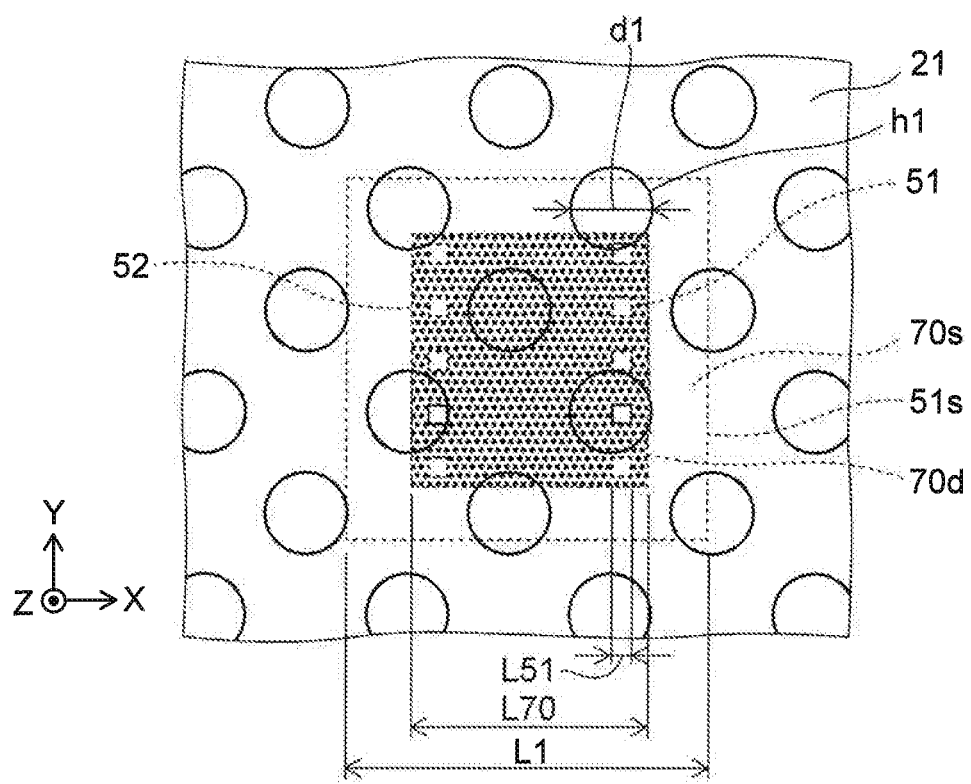
FIG. 2 is a schematic plan view illustrating the sensor according to the first embodiment.

FIG. 2 is a schematic plan view illustrating the sensor according to the first embodiment.

FIG. 2 is a plan view as viewed along arrow AR1 of FIG. 1A. FIG. 2 is a perspective plan view illustrating the first magnetic portion 21, the sensing element portion 51s, and the first element 51.

As shown in FIG. 2, the sizes (e.g., the diameters) of the multiple holes h1 are smaller than the sensing element portion 51s and larger than the first element 51.

For example, one direction crossing the first direction (the Z-axis direction) is taken as a second direction. The second direction is, for example, the X-axis direction. A width d1 of one of the multiple first holes h1 along the second direction (the X-axis direction) is narrower (smaller) than a length L1 of the sensing element portion 51s along the second direction. The width d1 is wider (larger) than a length L51 of the first element 51 along the second direction. For example, the width d1 is narrower (smaller) than a length (L70) of the film portion 70d along the second direction.

By such multiple first holes h1, the external force (e.g., the sound including the ultrasonic wave or the like) can be transmitted efficiently to the sensing element portion 51s while attenuating external magnetic fields (geomagnetism, etc.). Thereby, the effects of the external magnetic fields can be suppressed while maintaining high sensing sensitivity.

For example, the noise can be suppressed. According to the embodiment, a sensor can be provided in which stable characteristics are obtained.

For example, the size (the length L1) of the sensing element portion 51s is dependent on the size (a length L70) of the film portion 70d. The size of the film portion 70d is determined according to a characteristic (e.g., the frequency) of the target external force (e.g., the sound including the ultrasonic wave or the like). For example, in the embodiment, the length L70 is not less than about 100 μm and not more than about 1500 μm. For example, in the embodiment, the length L1 is not less than about 400 μm and not more than about 3000 μm. On the other hand, it is favorable for the sizes (the widths d1) of the multiple holes h1 to be small. For example, the effects on the acoustic characteristics of the region of the first magnetic portion 21 other than the multiple holes h1 can be suppressed by setting the width d1 to be small and the aperture ratio to be high. For example, the resonant frequency can be increased. For example, the range in which the frequency can be detected can be enlarged.

In the film portion 70d, the region where a large strain is obtained due to the external force is limited. For example, a large strain is generated in the region of the film portion 70d proximal to the supporter 70s. For example, by making the first element 51 smaller, the first element 51 can be provided in the region where the large strain is obtained. If the first element 51 is excessively large, a portion where a large strain is generated in the first element 51 and a portion where a small strain is generated in the first element 51 occur. Therefore, loss occurs in the conversion of the external force to the electrical resistance. By making the first element 51 smaller, the first element 51 is provided in the region where the large strain is obtained. Thereby, the loss can be suppressed; and a stable conversion can be performed.

Further, by making the first element 51 smaller, the multiple first elements 51 are easily provided in the region where the large strain is generated. For example, the noise can be suppressed by providing the multiple first elements 51 and by connecting the multiple first elements 51 in series.

Such characteristics are possible because the sensing sensitivity of the first element 51 including the magnetic layer can be maintained even in the case where the first element 51 is reduced.

In the embodiment, the size of the first element 51 is set to be small. The size (e.g., the length L51) of the first element 51 is not less than 5 μm and not more than 100 μm.

In the embodiment, the sizes (the widths d1) of the multiple holes h1 are set to be larger than such a small first element 51. The width d1 is set to be smaller than the size (the length L1) of the sensing element portion 51s (or the size (the length L70) of the film portion 70d).

Thereby, the effects of the external magnetic fields can be suppressed while maintaining high sensing sensitivity.

If the multiple holes h1 are excessively small, for example, there are cases where the path of the hole h1 becomes excessively narrow due to condensation caused by a change of the temperature, etc. Or, there are also cases where the holes h1 become plugged. Therefore, it is favorable for the sizes of the holes h1 to be larger than some value (e.g., the size of the first element 51). For example, the sizes (the widths d1) of the holes h1 can be set to be not less than 50 μm and not more than 500 μm. For example, the sizes (the widths d1) of the holes h1 can be set to be 300 μm or less.

In the embodiment, the sensing element portion 51s includes a magnetic layer. Therefore, it is necessary to suppress the effects of the external magnetic fields on the magnetic layer (the magnetic shield characteristics) and to efficiently transmit the external force (e.g., the sound including the ultrasonic wave or the like) (the acoustic characteristics). Such special circumstances exist.

For example, from the perspective of the acoustic characteristics, it is favorable for the aperture ratio of the multiple first holes h1 in the first magnetic portion 21 to be high. For example, from the perspective of the acoustic characteristics, it is favorable for the aperture ratio to be, for example, 30% or more. On the other hand, from the perspective of the magnetic shield characteristics, it is favorable for the aperture ratio to be low. From the perspective of the magnetic shield characteristics, it is favorable for the aperture ratio to be 80% or less. In the embodiment, it is favorable for the aperture ratio to be not less than 30% and not more than 80%.

For example, from the perspective of the acoustic characteristics, it is favorable for a thickness t21 (the length along the Z-axis direction referring to FIG. 1B) of the first magnetic portion 21 to be thin. From the perspective of the acoustic characteristics, it is favorable for the thickness t21 of the first magnetic portion 21 to be, for example, 0.3 mm or less. On the other hand, from the perspective of the magnetic shield characteristics, it is favorable for the thickness t21 to be thick. From the perspective of the magnetic shield characteristics, it is favorable for the thickness t21 to be 0.05 mm or more. In the embodiment, it is favorable for the thickness t21 to be not less than 0.05 mm and not more than 0.3 mm. The thickness t21 may be 0.25 mm or less.

From the perspective of the acoustic characteristics and the perspective of the magnetic shield characteristics, for the same aperture ratio, it is favorable for the sizes (the widths d1) of the holes h1 to be small. However, as described above, it is favorable for the sizes of the holes h1 to be larger than the size (the length L51) of the first element 51.

The third magnetic portion 23 is provided as described above. As shown in FIG. 1B, from the perspective of the acoustic characteristics, it is favorable for the thickness t21 of the first magnetic portion 21 to be thin. On the other hand, the perspective of the acoustic characteristics does not exist for the third magnetic portion 23 in which holes are not provided. Therefore, the thickness of the third magnetic portion 23 may be thick. Thereby, a high magnetic shielding effect is obtained.

As described above, the direction from the sensing element portion 51s toward the third magnetic portion 23 is aligned with a direction crossing the first direction (the Z-axis direction). As shown in FIG. 1B, the thickness t21 of the first magnetic portion 21 along the first direction (the Z-axis direction) is thinner than a length t23 of the third magnetic portion 23 along the crossing direction recited above. Thereby, good acoustic characteristics of the first magnetic portion 21 are obtained. Good magnetic shield characteristics of the third magnetic portion 23 are obtained. The crossing direction recited above may be any one direction aligned with the X-Y plane. For example, the crossing direction recited above may be the X-axis direction or the Y-axis direction.

As shown in FIG. 1C, the sensing element portion 51s is provided between multiple regions of the third magnetic portion 23 in the crossing direction recited above. For example, the sensing element portion 51s is provided between multiple regions of the third magnetic portion 23 in any direction along the X-Y plane. For example, the third magnetic portion 23 is provided around the sensing element portion 51s in the X-Y plane.

An example of the sensing element portion 51s will now be described.

Figure 3A:
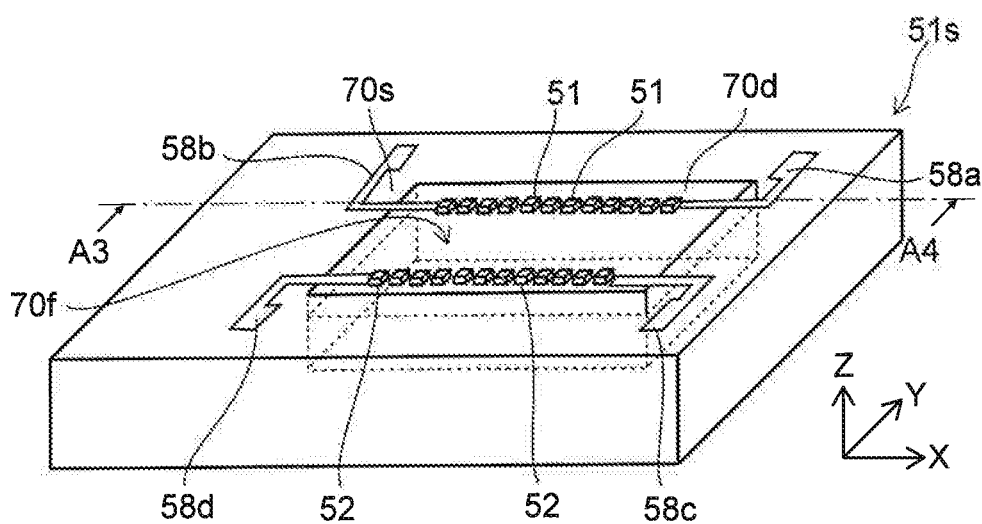
FIG. 3A to FIG. 3C are schematic views illustrating a portion of the sensor according to the first embodiment.
Figures 3B, 3C:
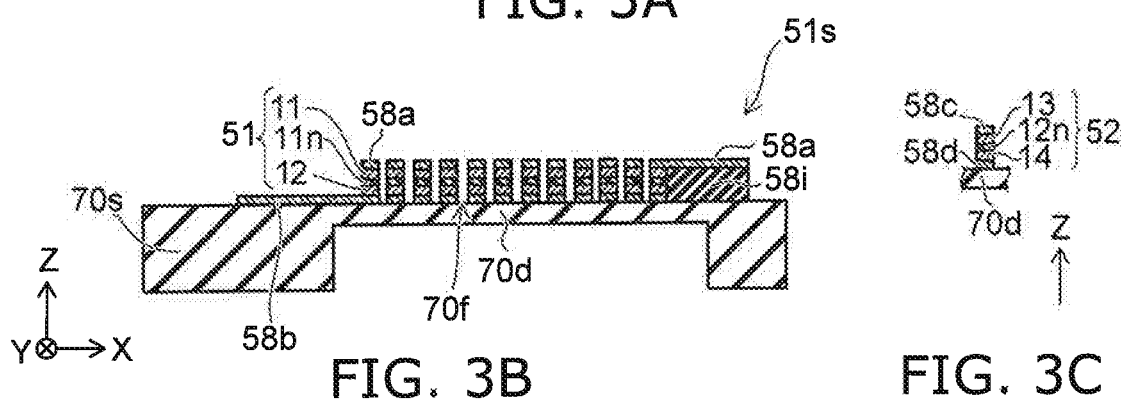

FIG. 3A to FIG. 3C are schematic views illustrating a portion of the sensor according to the first embodiment.

FIG. 3A is a perspective view. FIG. 3B is a line A3-A4 cross-sectional view of FIG. 3A. FIG. 3C is a cross-sectional view of the second element 52.

The film portion 70d is supported by the supporter 70s. The film portion 70d is deformable. For example, the film portion 70d is deformable due to an external force applied to the film portion 70d. The external force is, for example, sound (also including an ultrasonic wave) transmitted to the film portion 70d via the multiple holes h1. The film portion 70d is, for example, a diaphragm. In the example, the film portion 70d is a "fixed beam." The film portion 70d may be a "cantilever beam."

The first element 51 is provided at the film portion 70d. Multiple first elements 51 are provided in the example. At least two of the multiple first elements 51 may be connected in series to each other. The second element 52 also is provided at the film portion 70d. Multiple second elements 52 are provided in the example. At least two of the multiple second elements 52 may be connected in series to each other.

As shown in FIG. 3B, the first element 51 includes a first magnetic layer 11, a second magnetic layer 12, and a first intermediate layer 11n. In the example, the second magnetic layer 12 is provided between the first magnetic layer 11 and the film portion 70d. The first intermediate layer 11n is provided between the first magnetic layer 11 and the second magnetic layer 12 and is nonmagnetic.

The direction from the second magnetic layer 12 toward the first magnetic layer 11 is aligned with the first direction (the Z-axis direction). A first direction D1 crosses a film surface 70f of the film portion 70d (referring to FIG. 3A and FIG. 3B).

As shown in FIG. 3C, the second element 52 includes a third magnetic layer 13, a fourth magnetic layer 14, and a second intermediate layer 12n. In the example, the fourth magnetic layer 14 is provided between the third magnetic layer 13 and the film portion 70d. The second intermediate layer 12n is provided between the third magnetic layer 13 and the fourth magnetic layer 14 and is nonmagnetic. For example, the first to fourth magnetic layers 11 to 14 are ferromagnetic.

First to fourth conductive layers 58a to 58d are provided in the example. The first magnetic layer 11, the second magnetic layer 12, and the first intermediate layer 11n are provided between the first conductive layer 58a and the second conductive layer 58b. The third magnetic layer 13, the fourth magnetic layer 14, and the second intermediate layer 12n are provided between the third conductive layer 58c and the fourth conductive layer 58d. For example, these conductive layers are electrically connected respectively to the wires 51w and are electrically connected to the control element portion 68. In the example as shown in FIG. 3B, an insulating layer 58i is provided between the first conductive layer 58a and the film portion 70d.

As shown in FIG. 3B, for example, a portion of the member used to form the supporter 70s and the film portion 70d may be removed; and the thin portion where the removal is performed may be used to form the film portion 70d. For example, the thick portion may be used to form the supporter 70s.

For example, the resistance of the sensing element portion 51s (the electrical resistance of at least one of the first element 51 or the second element 52) changes according to the deformation of the film portion 70d. For example, at least one of the orientation of the magnetization of the first magnetic layer 11 or the orientation of the magnetization of the second magnetic layer 12 changes when the external force is applied to the film portion 70d. The angle between these magnetizations changes. For example, this is based on magnetostriction. The electrical resistance changes due to the change of the angle. For example, this is based on the magnetoresistance effect. The applied external force (e.g., the sound or the like) can be detected by detecting the change of the resistance of the sensing element portion 51s.

In one example, for example, the orientation of the magnetization of the first magnetic layer 11 changes more easily than the magnetization of the second magnetic layer 12. In such a case, for example, the first magnetic layer 11 is a free magnetic layer. For example, the second magnetic layer 12 is a reference layer. In another example, the first magnetic layer 11 may be a reference layer; and the second magnetic layer 12 may be a free magnetic layer. Both of the orientations of the two magnetizations may change according to the deformation of the film portion 70d.

In the embodiment, for example, the film portion 70d deforms due to the external force (e.g., the sound including the ultrasonic wave) received by the sensor 110; and the deformation of the film portion 70d is converted into an electrical resistance by the magnetic layer.

The length L51 (referring to FIG. 2) is, for example, the length along the second direction of the first magnetic layer 11. The length L51 (referring to FIG. 2) may be, for example, the length along the second direction of the second magnetic layer 12.

Figure 4:
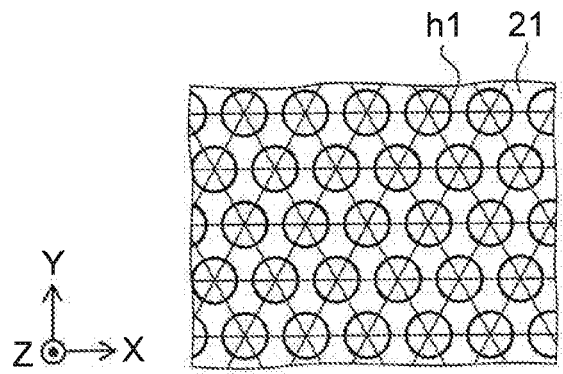
FIG. 4 is a schematic plan view illustrating the sensor according to the first embodiment.

FIG. 4 is a schematic plan view illustrating the sensor according to the first embodiment.

FIG. 4 shows an example of the arrangement of the multiple holes h1 in the first magnetic portion 21. As shown in FIG. 4, the multiple first holes h1 may be arranged in a hexagonal configuration (e.g., a regular hexagonal configuration). For example, the multiple first holes h1 are provided densely. For example, the density of the multiple first holes h1 can be high. For example, the aperture ratio can be high. Good acoustic characteristics are obtained.

Figure 5:
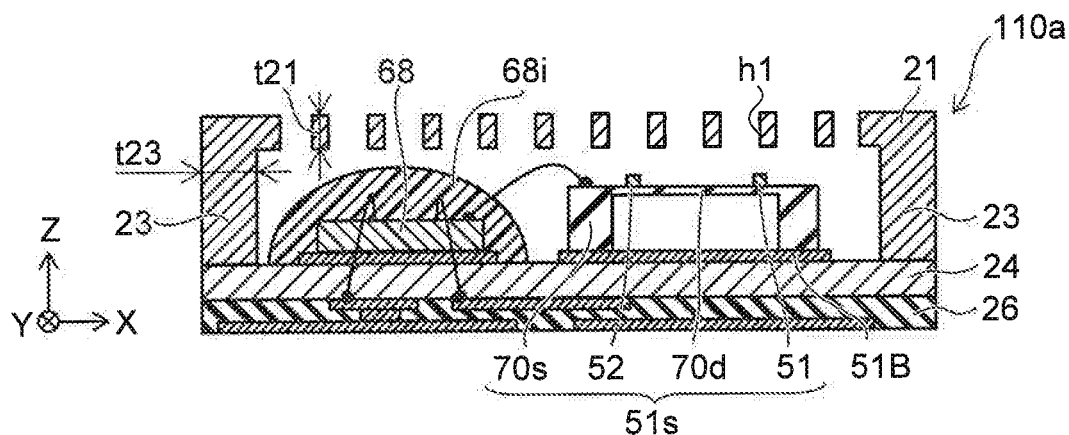
FIG. 5 is a schematic cross-sectional view illustrating a sensor according to the first embodiment.
Figure 6:
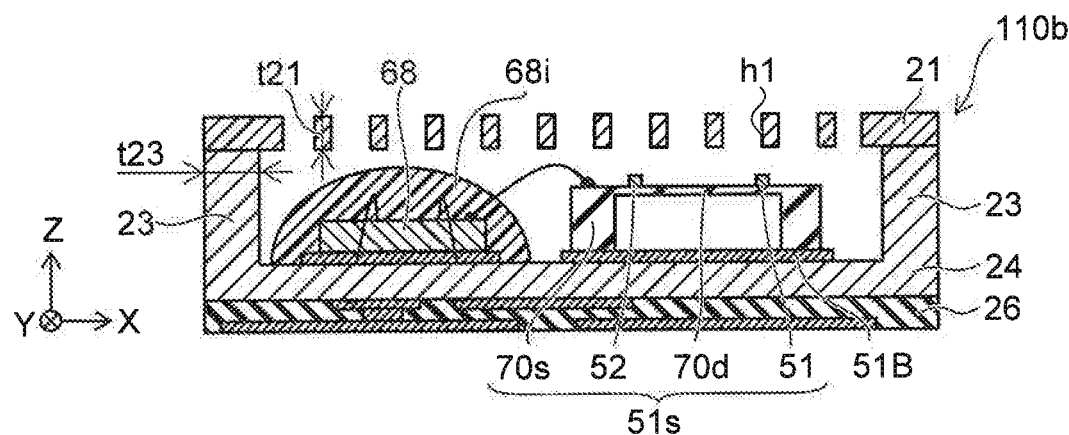
FIG. 6 is a schematic cross-sectional view illustrating a sensor according to the first embodiment.

FIG. 5 and FIG. 6 are schematic cross-sectional views illustrating sensors according to the first embodiment.

These drawings are cross-sectional views corresponding to FIG. 1B. The first magnetic portion 21 and the third magnetic portion 23 may be one body as in a sensor 110a illustrated in FIG. 5. The first magnetic portion 21 and the third magnetic portion 23 are continuous with each other. The first magnetic portion 21 and the third magnetic portion 23 are seamless. The fourth magnetic portion 24 and the third magnetic portion 23 may be one body as in a sensor 110b illustrated in FIG. 6. The fourth magnetic portion 24 and the third magnetic portion 23 are continuous with each other. The fourth magnetic portion 24 and the third magnetic portion 23 are seamless. For example, the number of parts is low in the sensors 110a and 110b. For example, the manufacturing cost can be reduced.

Figure 7:
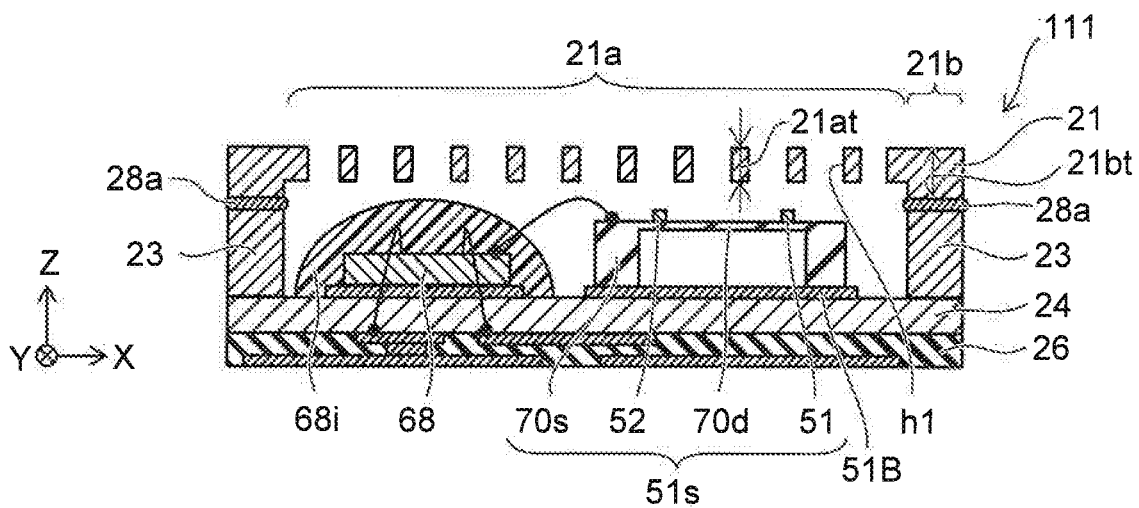
FIG. 7 is a schematic cross-sectional view illustrating a sensor according to the first embodiment.

FIG. 7 is a schematic cross-sectional view illustrating a sensor according to the first embodiment.

FIG. 7 is a cross-sectional view corresponding to FIG. 1B. As shown in FIG. 7, the cross-sectional configuration of the first magnetic portion 21 of the sensor 111 according to the embodiment is different from the cross-sectional configuration of the first magnetic portion 21 of the sensor 110. Otherwise, the configuration of the sensor 111 is similar to the configuration of the sensor 110.

As shown in FIG. 7, the first magnetic portion 21 includes a first partial region 21a and a second partial region 21b. For example, the second partial region 21b is provided on the outer side of the first partial region 21a. At least a portion of the first partial region 21a overlaps the sensing element portion 51s in the first direction (the Z-axis direction). The first partial region 21a does not overlap the third magnetic portion 23 in the first direction (the Z-axis direction). The second partial region 21b does not overlap the sensing element portion 51s in the first direction (the Z-axis direction). The second partial region 21b overlaps the third magnetic portion 23 in the first direction (the Z-axis direction).

A thickness 21at along the first direction of the first partial region 21a is thinner than a thickness 21bt along the first direction of the second partial region 21b.

For example, such a thickness difference can be formed by selectively etching a portion of the magnetic member used to form the first magnetic portion 21. The multiple holes h1 may be formed simultaneously with the etching.

By using such a first magnetic portion 21, for example, the desired space between the first magnetic portion 21 and the fourth magnetic portion 24 can be formed easily. The first magnetic portion 21 and the third magnetic portion 23 are formed easily.

A first member 28a is provided in the example. The first magnetic portion 21 is provided separately from the third magnetic portion 23. The first member 28a is provided between the first magnetic portion 21 and the third magnetic portion 23. The first member 28a bonds the first magnetic portion 21 and the third magnetic portion 23.

By using the first member 28a, for example, the first magnetic portion 21 can be provided separately from the third magnetic portion 23. Thereby, for example, the formation of the first magnetic portion 21 (and the third magnetic portion 23) is easy compared to the case where the first magnetic portion 21 is continuous with the third magnetic portion 23.

Second Embodiment

A sensor according to a second embodiment also includes the sensing element portion 51s and the first magnetic portion 21. Examples of the multiple holes h1 of the first magnetic portion 21 of the second embodiment will now be described. Other than the multiple holes h1, the configuration may be similar to the configuration of the first embodiment.

Figure 8:
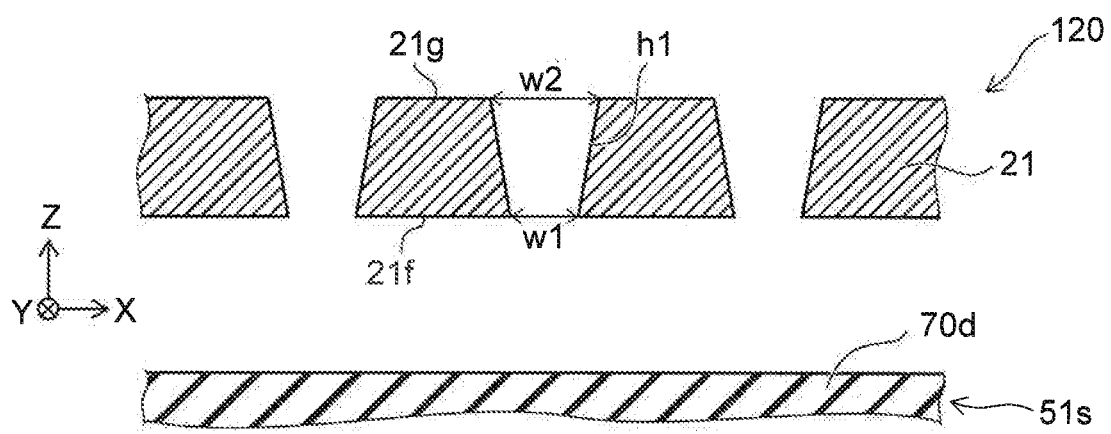
FIG. 8 is a schematic cross-sectional view illustrating a sensor according to the second embodiment.

FIG. 8 is a schematic cross-sectional view illustrating a sensor according to the second embodiment.

FIG. 8 is a cross-sectional view corresponding to FIG. 1B. In the sensor 120 according to the embodiment as shown in FIG. 8, the first magnetic portion 21 has a first surface 21f and a second surface 21g. The first surface 21f is between the second surface 21g and the sensing element portion 51s in the first direction (the Z-axis direction). The first surface 21f is the surface on the sensing element portion 51s side.

The first magnetic portion 21 includes the multiple first holes h1. The width at the first surface 21f of one of the multiple first holes h1 is taken as a first width w1. The width at the second surface 21g of the one of the multiple first holes h1 is taken as a second width w2. The first width w1 is different from the second width w2.

In the example, the first width w1 is narrower (smaller) than the second width w2. Thereby, for example, the effects of the external magnetic fields can be suppressed effectively while maintaining good acoustic characteristics.

For example, such multiple first holes h1 are obtained by etching the magnetic member used to form the first magnetic portion 21 from the second surface 21g side and by appropriately controlling the etching conditions.

Figure 9:
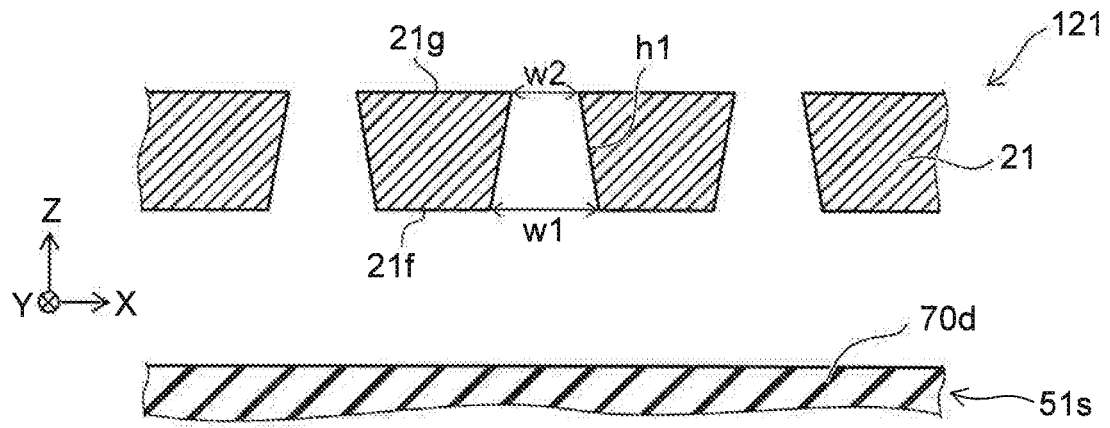
FIG. 9 is a schematic cross-sectional view illustrating a sensor according to the second embodiment.

FIG. 9 is a schematic cross-sectional view illustrating a sensor according to the second embodiment.

FIG. 9 is a cross-sectional view corresponding to FIG. 1B. In the sensor 121 according to the embodiment as shown in FIG. 9, the first width w1 is narrower (smaller) than the second width w2. Thereby, for example, the effects of the external magnetic fields can be suppressed effectively while maintaining good acoustic characteristics.

For example, such multiple first holes h1 are obtained by etching the magnetic member used to form the first magnetic portion 21 from the first surface 21f side and by appropriately controlling the etching conditions.

Figure 10:
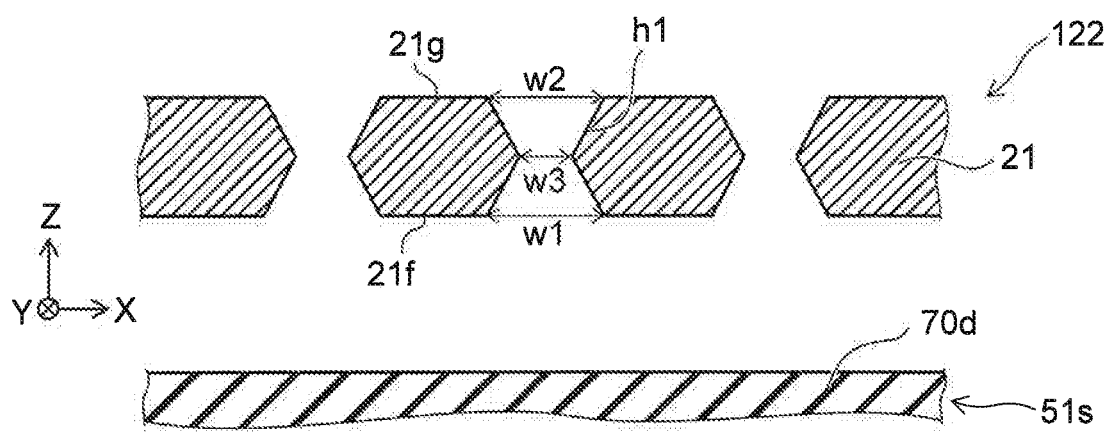
FIG. 10 is a schematic cross-sectional view illustrating a sensor according to the second embodiment.

FIG. 10 is a schematic cross-sectional view illustrating a sensor according to the second embodiment.

FIG. 10 is a cross-sectional view corresponding to FIG. 1B. In the sensor 122 according to the embodiment as shown in FIG. 10, the widths of the multiple holes h1 increase and decrease in the Z-axis direction.

For example, the first magnetic portion 21 has the first surface 21f and the second surface 21g. One of the multiple first holes h1 has the first to third widths w1 to w3. The first width w1 is the width at the first surface 21f. The second width w2 is the width at the second surface 21g. The third width w3 is the width at the position between the first surface 21f and the second surface 21g. The third width w3 is narrower than the first width w1 and narrower than the second width w2.

Thereby, for example, the effects of the external magnetic fields can be suppressed effectively while maintaining good acoustic characteristics.

For example, such multiple first holes h1 are obtained by etching the magnetic member used to form the first magnetic portion 21 from the first surface 21f side and the second surface 21g side and by appropriately controlling the etching conditions.

Third Embodiment

A sensor according to a third embodiment also includes the sensing element portion 51s and the first magnetic portion 21. An example of the multiple holes h1 of the first magnetic portion 21 of the third embodiment will now be described. Other than the multiple holes h1, the configuration may be similar to the configuration of the first embodiment.

Figure 11:
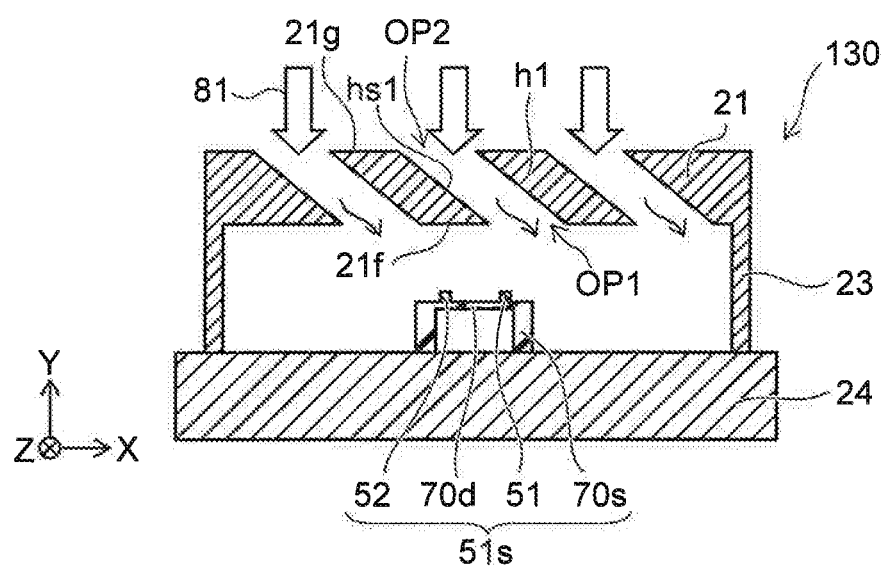
FIG. 11 is a schematic cross-sectional view illustrating the sensor according to the third embodiment.

FIG. 11 is a schematic cross-sectional view illustrating the sensor according to the third embodiment.

FIG. 11 is a cross-sectional view corresponding to FIG. 1B. As shown in FIG. 11, the first magnetic portion 21 includes the multiple first holes h1 in the sensor 130 according to the embodiment as well. In the sensor 130, the extension direction of one of the multiple first holes h1 is tilted with respect to the first direction (the Z-axis direction). A side surface hs1 of the one of the multiple first holes h1 is tilted with respect to the first direction. The side surface hs1 is a surface crossing the X-Y plane.

Thereby, for example, the effects of the external magnetic fields can be suppressed effectively while maintaining good acoustic characteristics.

For example, the first magnetic portion 21 has the first surface 21f and the second surface 21g. The first surface 21f is between the second surface 21g and the sensing element portion 51s in the first direction (the Z-axis direction). For example, a first opening OP1 at the first surface 21f of one of the multiple first holes h1 does not overlap, in the first direction (the Z-axis direction), a second opening OP2 at the second surface 21g of the one of the multiple first holes h1. Thereby, for example, the effects of the external magnetic fields along the Z-axis direction can be suppressed effectively.

Fourth Embodiment

Figure 12:
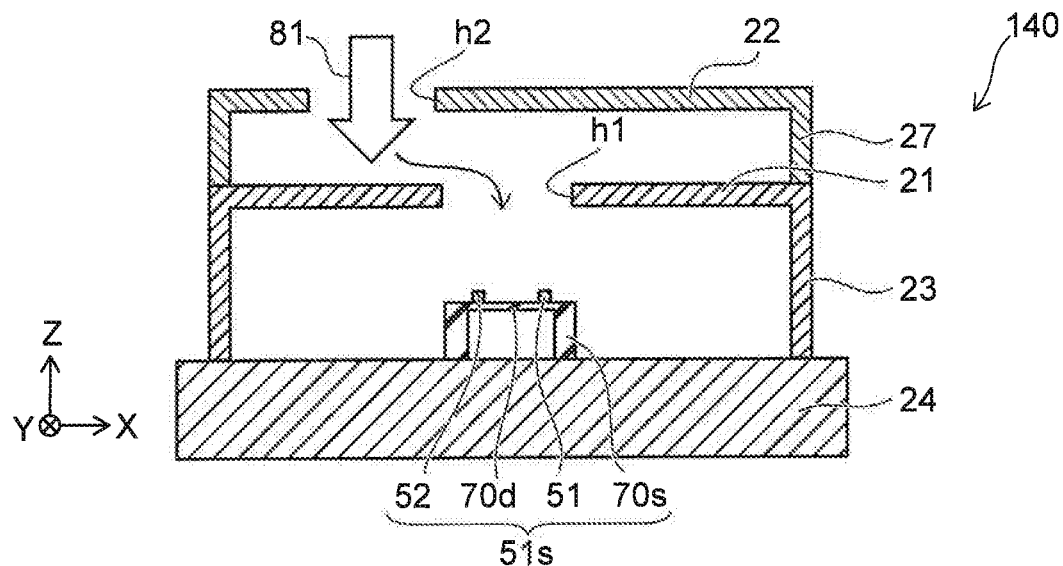
FIG. 12 is a schematic cross-sectional view illustrating a sensor according to a fourth embodiment.

FIG. 12 is a schematic cross-sectional view illustrating a sensor according to a fourth embodiment.

As shown in FIG. 12, the sensor 140 according to the embodiment includes a second magnetic portion 22 in addition to the sensing element portion 51s and the first magnetic portion 21. Otherwise, the configuration of the sensor 140 may be similar to that of the sensor 110. An example of the first magnetic portion 21 and the second magnetic portion 22 will now be described.

The first magnetic portion 21 is separated from the sensing element portion 51s. The first magnetic portion 21 is provided between the second magnetic portion 22 and the sensing element portion 51s in the first direction (the Z-axis direction). The first magnetic portion 21 is separated from the second magnetic portion 22 in the first direction.

For example, a spacer 27 may be provided between the outer edge of the first magnetic portion 21 and the outer edge of the second magnetic portion 22. The spacer 27 may be, for example, a magnetic body. The spacer 27 may be, for example, a nonmagnetic body. A space is formed between the first magnetic portion 21 and the second magnetic portion 22.

The first magnetic portion 21 includes one or multiple first holes h1. The second magnetic portion 22 includes one or multiple second holes h2. In the example, one first hole h1 is provided; and one second hole h2 is provided.

By such a configuration, an external force 81 passes through these holes and is transmitted to the sensing element portion 51s. On the other hand, the external magnetic fields are attenuated by the first magnetic portion 21 even if transmitted by the second hole h2. Thereby, higher magnetic shield characteristics are obtained. For example, the first hole h1 does not overlap the second hole h2 in the first direction (the Z-axis direction). Thereby, an external magnetic field that is incident along the Z-axis direction is suppressed effectively.

Figures 13A, 13B:
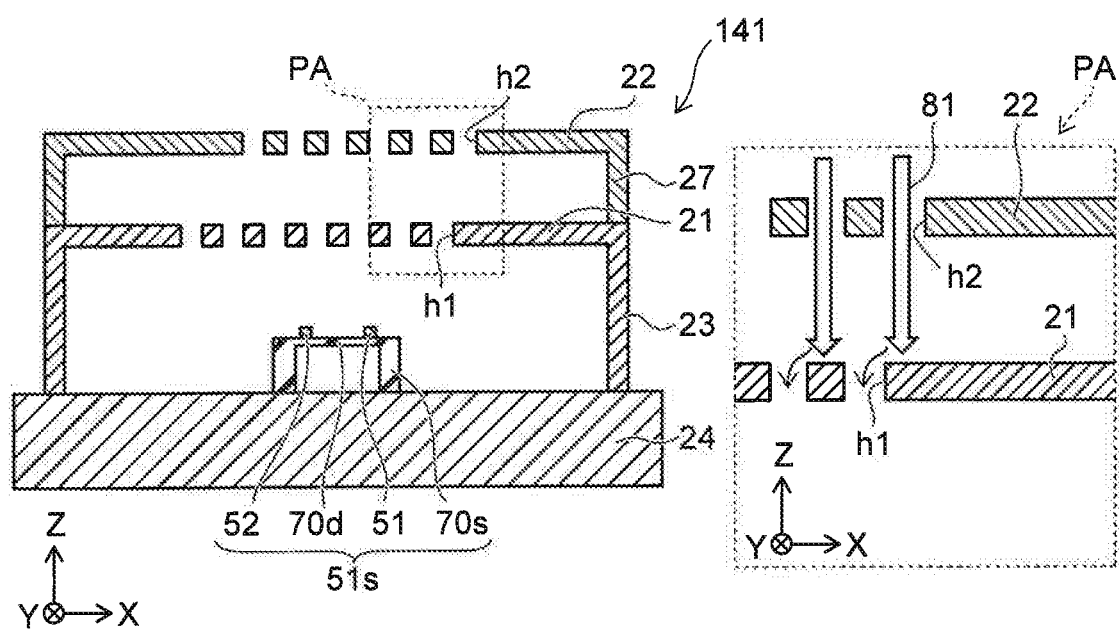
FIG. 13A and FIG. 13B are schematic cross-sectional views illustrating a sensor according to a fourth embodiment.

FIG. 13A and FIG. 13B are schematic cross-sectional views illustrating a sensor according to a fourth embodiment.

FIG. 13B shows an enlarged portion PA of FIG. 13A. As shown in FIG. 13A, the sensor 141 according to the embodiment also includes the sensing element portion 51s, the first magnetic portion 21, and the second magnetic portion 22. Otherwise, the configuration of the sensor 141 may be similar to that of the sensor 110. In the sensor 141, the first magnetic portion 21 includes the multiple first holes h1. The second magnetic portion 22 includes the multiple second holes h2.

As shown in FIG. 13B, one of the multiple second holes h2 does not overlap one of the multiple first holes h1 in the first direction (the Z-axis direction). Thereby, the external magnetic field that is incident along the Z-axis direction is suppressed effectively.

The second magnetic portion 22 that includes the second holes h2 may be provided in any sensor according to the first to third embodiments.

In the embodiments, at least one of the first to fourth magnetic portions 21 to 24 includes, for example, at least one selected from the group consisting of Fe, Ni, and Co. At least one of the first to fourth magnetic portions 21 to 24 may include, for example, an alloy including Ni and Fe. At least one of the first to fourth magnetic portions 21 to 24 includes, for example, at least one selected from the group consisting of permalloy (Ni—Fe), ferrite, and silicon steel. At least one of the first to fourth magnetic portions 21 to 24 may include, for example, a Ni—Fe alloy including not less than 30 atomic percent and not more than 90 atomic percent of Ni. At least one of the first to fourth magnetic portions 21 to 24 may include, for example, a Ni—Fe alloy further including at least one type of element selected from the group consisting of molybdenum, copper, and chrome. For example, it is desirable for the permeabilities of the magnetic materials included in the first to fourth magnetic portions 21 to 24 to be 500 or more. It is more desirable for the relative permeabilities of the magnetic materials included in the first to fourth magnetic portions 21 to 24 to be 5000 or more.

At least one of the first to fourth magnetic layers 11 to 14 includes, for example, at least one selected from the group consisting of Fe and Co.

At least one of the first or second nonmagnetic layer 11n or 12n includes, for example, MgO.

At least a portion of the film portion 70d includes at least one selected from the group consisting of silicon oxide, silicon oxynitride, silicon nitride, and aluminum oxide.

Fifth Embodiment

A sensor according to a fifth embodiment also includes the sensing element portion 51s and the first magnetic portion 21. Examples of the multiple first holes h1 of the first magnetic portion 21 of the fifth embodiment will now be described. Other than the multiple holes first h1, the configuration may be similar to the configuration of the first embodiment. Other than the configuration of the first holes h1, the configuration may be similar to the configuration of the second embodiment.

Figure 14:
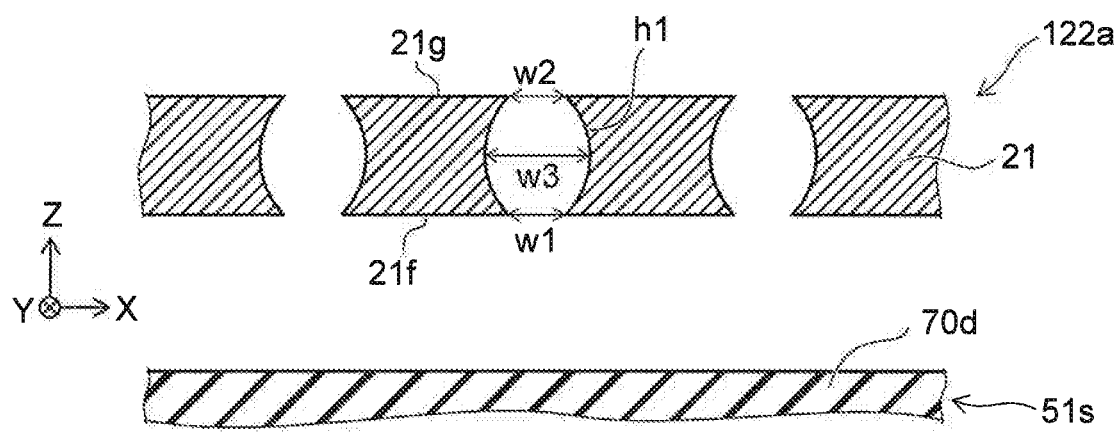
FIG. 14 is a schematic cross-sectional view illustrating a sensor according to the fifth embodiment.

FIG. 14 is a schematic cross-sectional view illustrating a sensor according to the fifth embodiment.

FIG. 14 is a cross-sectional view corresponding to FIG. 1B. In the sensor 122a according to the embodiment as shown in FIG. 14, the widths of the multiple first holes h1 increase and decrease in the Z-axis direction.

For example, the first magnetic portion 21 has the first surface 21f and the second surface 21g. One of the multiple first holes h1 has the first to third widths w1 to w3. The first width w1 is the width at the first surface 21f. The second width w2 is the width at the second surface 21g. The third width w3 is the width at a position between the first surface 21f and the second surface 21g. The third width w3 is wider than the first width w1 and wider than the second width w2.

For example, the effects of the external magnetic fields can be suppressed effectively while maintaining good acoustic characteristics.

For example, such multiple first holes h1 are obtained by appropriately controlling the patterning conditions of the magnetic member used to form the first magnetic portion 21. The increase and decrease in the Z-axis direction of the widths of the multiple first holes h1 may be linear or curvilinear.

Figure 15:
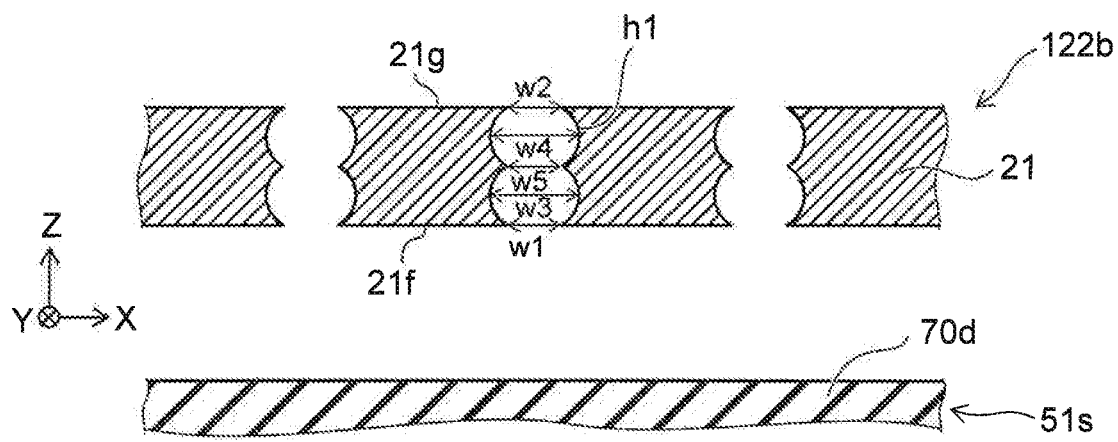
FIG. 15 is a schematic cross-sectional view illustrating a sensor according to the fifth embodiment.

FIG. 15 is a schematic cross-sectional view illustrating a sensor according to the fifth embodiment.

FIG. 15 is a cross-sectional view corresponding to FIG. 1B. As shown in FIG. 15, the widths of the multiple first holes h1 increase and decrease in the Z-axis direction in the sensor 122b according to the embodiment as well.

For example, one of the multiple first holes h1 has the first to fifth widths w1 to w5. The first width w1 is the width at the first surface 21f. The second width w2 is the width at the second surface 21g. The third width w3 is the width at a position between the first surface 21f and the second surface 21g. The fourth width w4 is the width at a position between the second surface 21g and a position corresponding to the third width w3. The fifth width w5 is the width at a position between a position corresponding to the third width w3 and a position corresponding to the fourth width w4.

For example, the third width w3 is wider than the first width w1, wider than the second width w2, and wider than the fifth width w5. The fourth width w4 is wider than the first width w1, wider than the second width w2, and wider than the fifth width w5.

The number of the increases and decreases in the Z-axis direction of the widths of the multiple first holes h1 may be one, two, or more. The increase and decrease in the Z-axis direction of the widths of the multiple first holes h1 may be linear or curvilinear.

According to the embodiments, a sensor is provided in which stable characteristics are obtained.

In this specification, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the sensor such as the sensing element, the supporter, the film portion, the element, the magnetic layer, the intermediate layer, the electrode, the magnetic portion, the control element portion, the base body, etc., from known art; and such practice is within the scope of the invention to the extent that similar effects can be obtained.

Any two or more components of the specific examples may be combined within the extent of technical feasibility and are within the scope of the invention to the extent that the spirit of the invention is included.

All sensors practicable by an appropriate design modification by one skilled in the art based on the sensors described above as the embodiments of the invention also are within the scope of the invention to the extent that the spirit of the invention is included.

Various modifications and alterations within the spirit of the invention will be readily apparent to those skilled in the art; and all such modifications and alterations should be seen as being within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
    a sensing element portion, including
        a supporter,
        a film portion supported by the supporter, the film portion being deformable, and
        a first element including a magnetic layer and being provided at the film portion; and
    a first magnetic portion separated from the sensing element portion,
    the first magnetic portion including a plurality of first holes,
    a width of one of the plurality of first holes along a second direction being narrower than a length of the sensing element portion along the second direction and wider than a length of the first element along the second direction, the second direction crossing a first direction from the film portion toward the first element.

2. The sensor according to claim 1, wherein the width is narrower than a length of the film portion along the second direction.

3. The sensor according to claim 1, wherein at least a portion of the plurality of first holes overlaps the sensing element portion in the first direction.

4. The sensor according to claim 1, wherein
    the first magnetic portion includes a region between the plurality of first holes, and
    the region overlaps the sensing element portion in the first direction.

5. The sensor according to claim 1, wherein an aperture ratio of the plurality of first holes in the first magnetic portion is 30% or more.

6. The sensor according to claim 1, wherein the width is 0.3 mm or less.

7. The sensor according to claim 1, wherein the plurality of first holes is arranged in a hexagonal configuration.

8. The sensor according to claim 1, wherein the first magnetic portion includes Ni and Fe.

9. The sensor according to claim 1, wherein
    the first magnetic portion includes:
        a first partial region; and
        a second partial region,
    at least a portion of the first partial region overlaps the sensing element portion in the first direction, and
    a thickness along the first direction of the first partial region is thinner than a thickness along the first direction of the second partial region.

10. The sensor according to claim 1, further comprising a second magnetic portion including a plurality of second holes,
    the first magnetic portion being provided between the second magnetic portion and the sensing element portion in the first direction,
    the first magnetic portion being separated from the second magnetic portion.

11. The sensor according to claim 10, wherein the first hole does not overlap the second hole in the first direction.

12. The sensor according to claim 1, wherein a thickness along the first direction of the first magnetic portion is not less than 0.05 mm and not more than 0.3 mm.

13. The sensor according to claim 1, further comprising a third magnetic portion,
    a direction from the sensing element portion toward the third magnetic portion being aligned with a direction crossing the first direction.

14. The sensor according to claim 13, wherein the sensing element portion is provided between a plurality of regions of the third magnetic portion in the crossing direction.

15. The sensor according to claim 13, wherein a thickness of the first magnetic portion along the first direction is thinner than a length of the third magnetic portion along the crossing direction.

16. A sensor, comprising:
a sensing element portion including
 a supporter,
 a film portion supported by the supporter, the film portion being deformable, and
 a first element including a magnetic layer and being provided at the film portion; and
a first magnetic portion separated from the sensing element portion,
the first magnetic portion having a first surface and a second surface crossing a first direction, the first direction being from the film portion toward the first element, the first surface being between the second surface and the sensing element portion,
the first magnetic portion including a plurality of first holes,
a first width of one of the plurality of first holes at the first surface being different from a second width of the one of the plurality of first holes at the second surface.

17. A sensor, comprising:
a sensing element portion including
 a supporter,
 a film portion supported by the supporter, the film portion being deformable, and
 a first element including a magnetic layer and being provided at the film portion; and
a first magnetic portion separated from the sensing element portion,
the first magnetic portion having a first surface and a second surface crossing a first direction, the first direction being from the film portion toward the first element, the first surface being between the second surface and the sensing element portion,
the first magnetic portion including a plurality of first holes,
one of the plurality of first holes having
 a first width at the first surface,
 a second width at the second surface, and
 a third width at a position between the first surface and the second surface,
the third width being narrower than the first width and narrower than the second width.

18. A sensor, comprising:
a sensing element portion including
 a supporter,
 a film portion supported by the supporter, the film portion being deformable, and
 a first element including a magnetic layer and being provided at the film portion; and
a first magnetic portion separated from the sensing element portion,
the first magnetic portion including a plurality of first holes,
an extension direction of one of the plurality of first holes being tilted with respect to a first direction, the first direction being from the film portion toward the first element.

19. The sensor according to claim 18, wherein
the first magnetic portion has a first surface and a second surface,
the first surface is between the second surface and the sensing element portion in the first direction, and
a first opening at the first surface of the one of the plurality of first holes does not overlap, in the first direction, a second opening at the second surface of the one of the plurality of first holes.

20. A sensor, comprising:
a sensing element portion including
 a supporter,
 a film portion supported by the supporter, the film portion being deformable, and
 a first element including a magnetic layer and being provided at the film portion;
a first magnetic portion separated from the sensing element portion; and
a second magnetic portion, the first magnetic portion being separated from the second magnetic portion and provided between the second magnetic portion and the sensing element portion in a first direction, the first direction being from the film portion toward the first element,
the first magnetic portion including one or a plurality of first holes,
the second magnetic portion including one or a plurality of second holes.

* * * * *